United States Patent [19]

Dufresne

[11] Patent Number: 5,785,861
[45] Date of Patent: Jul. 28, 1998

[54] REGENERATION OF PERCHLOROETHYLENE

[76] Inventor: Peter Dufresne, 428 Coachlight Bay SW., Calgary, Alberta, Canada, T3H 1Z2

[21] Appl. No.: 721,951

[22] Filed: Sep. 22, 1996

Related U.S. Application Data

[63] Continuation-in-part of Ser. No. 403,190, Mar. 13, 1995, abandoned.

[51] Int. Cl.$^6$ .................. C02F 1/42; C02F 1/28
[52] U.S. Cl. .................. 210/669; 210/690; 134/10; 134/13
[58] Field of Search .................. 210/917, 690, 210/689, 691, 692, 693, 694, 663, 669; 134/10, 13

[56] References Cited

U.S. PATENT DOCUMENTS

| | | | |
|---|---|---|---|
| 1,926,813 | 9/1933 | Morgen | 210/690 |
| 2,171,199 | 8/1939 | Urbain et al. | 210/694 |
| 2,171,201 | 8/1939 | Urbain et al. | 210/694 |
| 2,888,495 | 5/1959 | Kissling | 260/654 |
| 3,123,553 | 3/1964 | Abrams | 210/30 |
| 3,231,324 | 1/1966 | Young | 210/690 |
| 3,275,548 | 9/1966 | Walters | 210/692 |
| 3,309,166 | 3/1967 | Moncada et al. | 210/690 |
| 3,316,055 | 4/1967 | Moncada et al. | 210/690 |
| 3,420,709 | 1/1969 | Barrett, Jr. et al. | 210/917 |
| 3,438,892 | 4/1969 | Wymore et al. | 210/689 |
| 3,444,079 | 5/1969 | Bowers | 210/694 |
| 3,452,110 | 6/1969 | Cooley et al. | 260/654 |
| 3,503,878 | 3/1980 | Durr | 210/690 |
| 3,530,691 | 9/1970 | Borochaner | 210/687 |
| 3,922,217 | 11/1975 | Cohen et al. | 210/690 |
| 4,120,653 | 10/1978 | Smolka | 210/687 |
| 4,297,220 | 10/1981 | Meitzner et al. | 210/690 |
| 4,433,196 | 2/1984 | Yang et al. | 210/917 |
| 4,774,004 | 9/1988 | Gruenewaelder | 210/690 |
| 4,842,746 | 6/1989 | Fowler et al. | 210/690 |
| 5,019,542 | 5/1991 | Bento | 210/917 |

OTHER PUBLICATIONS

"Hypersol Macronet Sorbent Resins" Purolite Promotional Literature, 1995.

*Primary Examiner*—Cynthia L. Nessler
*Attorney, Agent, or Firm*—Ian Fincham

[57] ABSTRACT

A method for regenerating perchloroethylene by passing the fluid through a sorbent resin to remove fatty acids and other organic contaminants which reduce the fluid quality from new fluid quality. The method involves an optional step of treating the fluid with an anionic exchange resin to remove the organic dye contaminants. The key advantage over the prior art is that the process is economical, does not involve evaporative losses as realised in distillation cleaning and is environmentally friendly.

7 Claims, 1 Drawing Sheet

REGENERATION OF PERCHLOROETHYLENE

This is a continuation-in-part application of U.S. application Ser. No. 08/403,190, filed Mar. 13, 1995 now abandoned.

FIELD OF THE INVENTION

The present invention relates to the cleaning and regeneration of contaminated cleaning fluids and more particularly, the present invention relates to the purification of dry cleaning solvents.

BACKGROUND OF THE INVENTION

Generally speaking, in the dry cleaning industry, the clothes and other textiles are washed in organic solvent. During the cleaning cycle, the garments are agitated with solvent that is circulated through a dual-functioning filter system. The function of the filter system is firstly to remove particles such as dirt and other insoluble contaminants; and secondly to remove organic dyes by making use of activated carbon.

Since the soluble substances removed during the cleaning operation remain in the solvent after numerous uses, the solvent becomes discoloured and saturated with impurities to the extent that the garments, after the cleaning operation, may still contain a significant percentage of soluble impurities. This additionally has ramifications in terms of the garment being discoloured or otherwise adversely affected.

The changing of the dry cleaning fluid is a discretionary matter for the dry cleaning machine operator. The operator makes the decision as to whether the fluid will be replaced or with the more modern dry cleaning machines, a portion of the cleaning solvent will be cycled through a distillation unit.

In U.S. Pat. No. 2,888,495, Kissling teaches a method of purifying perchloroethylene. The method involves the use of either an anionic or cationic exchange resin. The result is that the perchloroethylene treated with the resin has an elevated pH and is therefore deacidified. Although this arrangement is effective for removing some of the contaminants from the contaminated perchloroethylene, there is no provision for removing organic dyes which can contaminate the garments to be cleaned.

U.S. Pat. No. 3,452,110, issued to Cooley, Jun. 24, 1969, teaches a further method of treating used dry cleaning solvents having impurities therein. The method involves the use of adding to the cleaning solvent a mixture of polyhydroxy alcohol and alkaline material, such as sodium carbonate as well as a filter powder, an example of which is given as diatomaceous earth, while agitating the mixture to form a colloidal suspension in the solvent and removing the subsequent formed solvent by filtration. This is a useful method as well, however, the final solvent is not cleansed to the point that the same can be reused for further cleaning cycles. In the reference, the patentee does not teach an organic dye removal system and further, there is no recirculation feature for the cleaned solvent.

Further prior art known to be generally related to the process as set forth herein is provided in Moncada et al., U.S. Pat. No. 3,316,055 issued Apr. 1967. The Moncada reference simply provides a bone char filter for cleansing cleaning fluid. The bone char, although a useful filtering compound in no way has the same properties as anionic exchange medium. The bone char, if the same were consistently used for cleaning dry cleaning fluid, would introduce undesirable compounds i.e. bone char residue and other insoluble compounds. This could lead to transfer onto clothing which is obviously in opposition to the point of cleansing the dry cleaning fluid in the first place.

As a particularly convenient process, Applicant has found that by making use of a sorbent resin substantially all of the fatty acids, aliphatic and aromatic hydrocarbons can be removed to the point that the perchloroethylene is returned to substantially new fluid quality. In a particularly significant advantage, the use of the sorbent resin, optionally with the anionic exchange resin circumvents the costly disadvantage of evaporative losses in fluid volume by employing distillation for the cleaning process. In a typical distillation operation, up to 25% of the perchloroethylene fluid can be lost per cleaning cycle. As is readily obvious, the evaporative losses contribute to poor air quality and expose the worker to high levels of gaseous organic solvents. The exposure can, over time, lead to not only health complications for the worker but also environmental concerns.

As a further disadvantage to conventional processes such as distillation, the evaporative losses add expense to the overall process.

In view of what the prior art has proposed, it would be desirable to have a process and apparatus for removing substantially all the impurities contained in cleaning solvents so that the solvent can be reused. The present invention is directed to satiating this need.

SUMMARY OF THE INVENTION

One object of the present invention is to provide an improved cleaning fluid impurity removal method.

A further object of one embodiment of the present invention is to provide a method for removing contaminants from a cleaning fluid to restore the fluid to new fluid quality, comprising the steps of:

providing a source of substantially anhydrous dry cleaning fluid containing insoluble, soluble and organic dye contaminants;

filtering, in a first step, said substantially anhydrous cleaning fluid in the absence of water to remove insoluble contaminants;

treating, in a second step, filtered fluid with an anionic exchange resin to remove at least some of said soluble contaminants contained therein; and removing, in a third step, said organic dye contaminants from said fluid treated with said anionic exchange resin by contacting said fluid with a sorbent resin having a high internal surface area whereby said fluid is substantially restored to new fluid quality.

A further object of the present invention is to provide a method of regenerating dry cleaning fluid with at least one of an anionic exchange resin or a sorbent resin, comprising the steps of:

providing a source of contaminated perchloroethylene contaminated with insoluble, soluble and organic dye contaminants;

filtering, in a first step, said contaminated perchloroethylene to remove said insoluble contaminants;

flushing, in a second step, said sorbent resin with uncontaminated perchloroethylene to reduce water content therein to below 15,000 ppm;

treating, in a third step, said contaminated cleaning fluid in flushed sorbent resin from said second step and removing said soluble and organic dye contaminants in said contaminated fluid, whereby said fluid is regenerated to new fluid quality.

The filter for use in removing the large insoluble materials such as lint and other solid debris which accumulates in cleaning fluid may comprise a fine nylon disposable filter. A suitable filter, as an example, may be a Knightcorp™ PK12. This filter is housed in a housing which is 12 inches in length and 4 inches in diameter and typically incorporates a clamp seal which can be easily removed for bag replacement. In one example, the surface area of the bag may be one square foot as this has been found to be effective for removal of lint and other solid debris and has a life span of approximately ten cleaning cycles. Other suitable filters will be readily appreciated by those skilled in the art.

In addition to the filter discussed hereinabove, numerous other filters or filter staging may be incorporated at various points throughout the apparatus to ensure the highly purified cleaning fluid which is substantially debris free. As a particularly attractive advantage to the use of the present invention, it has been found that a single pass through the apparatus results in a cleaning fluid which is essentially debris free and can be reused for many additional cleaning cycles. This is attractive from an environmental point of view since the "spent" perchloroethylene need not be discarded from the cleaning site and therefore reduces the amount of chemical toxins which need to be disposed of and dealt with.

Although the present invention has particular use of the dry cleaning industry for cleaning dry cleaning solvents, it will be readily appreciated that the apparatus can be used with any cleaning compound.

Preliminary exposure to the anionic exchange resin is not a critical step to be included in the method, however, this is useful when the impurity laden cleaning compound is exposed to the resin, the sorbent is not affected to the same degree that it would be in the absence of the anionic preliminary treatment. In this manner, the sorbent can more efficiently remove the organic dyes and other such soluble contaminants for a greater length of time.

Having thus described the invention, reference will now be made to the accompanying drawings illustrating preferred embodiments.

BRIEF DESCRIPTION OF THE DRAWINGS

A similar numeral in the figure denotes a similar element.

DETAILED DESCRIPTION OF THE DRAWINGS

Figure 1:
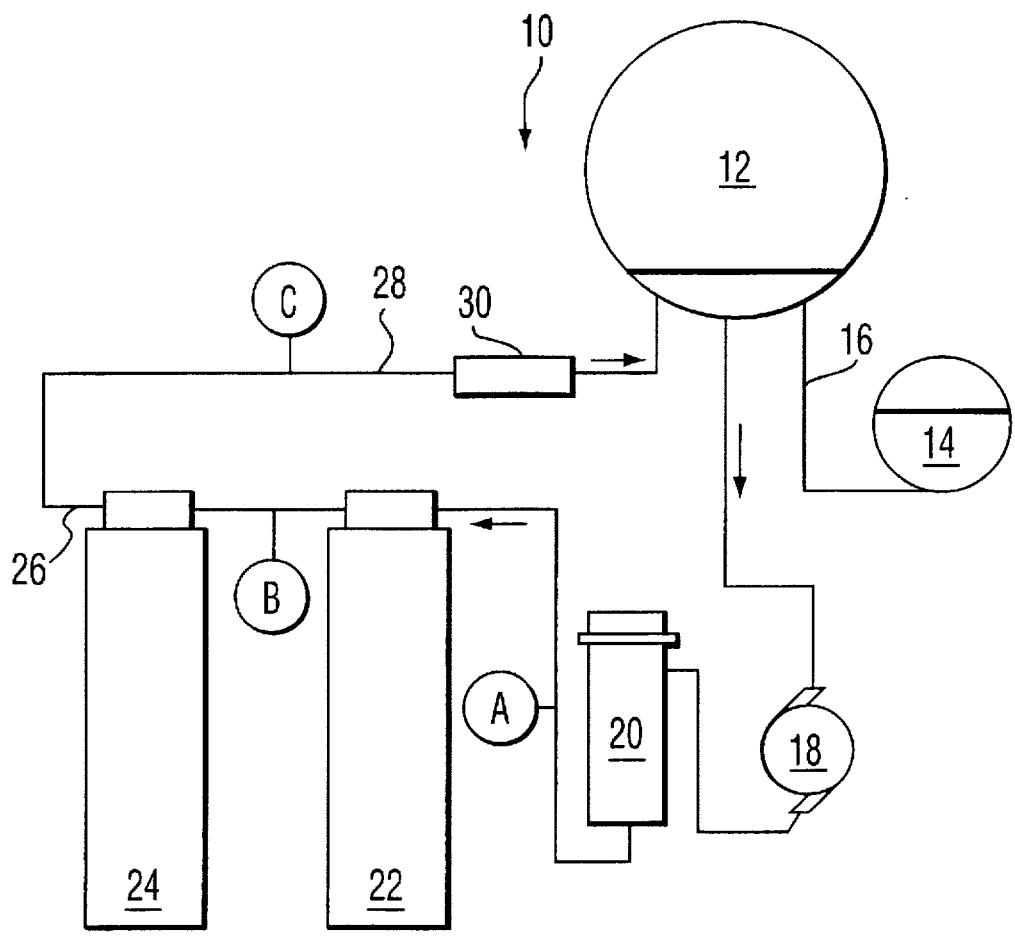
FIG. 1 is a schematic illustration of the apparatus incorporated for use in the present invention.

Referring to the figure, the overall apparatus according to one embodiment of the present invention, is shown and denoted by numeral 10. The dry cleaning unit, a known apparatus, is denoted by numeral 12. Unit 12 is in fluid communication with a main storage reservoir 14 which stores dry cleaning solvent. Tube 16 facilitates fluid communication between unit 12 and reservoir 14. It will be understood that tube 16 is a representative of the remaining tubing used in the apparatus to achieve fluid communication between the elements.

Unit 12 is additionally in fluid communication with a first pump 18, which pump forcibly passes the dry cleaning fluid which may contain soluble and insoluble impurities to be discussed hereinafter, into a first filter 20. Filter 20 may comprise a single filter or may be a plurality of serially arranged filtering units. In one possible form, the filter 20 provides a very fine (approximately 10 micron μm) pore disposable nylon filter bag (not shown). The purpose of the filter is to remove lint and other solid particles that would otherwise seriously reduce the efficiency of the overall system of the anionic exchange members discussed hereinafter.

Once large soluble debris has been removed from the fluid stream, the stream is then passed on to an anionic resin containing vessel 22.

The use of the first anionic exchange resin vessel 22 and the resin contained therein (not shown) is particularly effective for removing the fatty acids picked up from the garments during the cleaning cycle. As is known in this art, the highest percentage of the contaminants in solution are the fatty acids. The utilization of the anionic resin is a particularly attractive feature since its optimizes the life of the absorbent resin to which the filtrated fluid is passed.

In a preferred form, the anionic resin comprises Purolite™ A-850, a gel type strong base anionic exchange resin with an acrylic matrix. This resin type is a convenient selection since the same is compatible with perchloroethylene as well as other conventionally used cleaning agents. The bead screen size in U.S. standard screen is 16–50 mesh wet. Moisture retention, as indicated by the manufacturer, is specified as 57–62%.

The dry cleaning fluid is then passed to sorbent resin vessel 24 for further treatment. As an example, the sorbent resin employed was the Purolite Macronet™ MN-150. The manufacturer identifies this resin as being a cross-linked polymerized hydrocarbon, namely, polystyrene resin. This is a useful sorbent resin in that the same has a very high internal surface area in comparison to activated carbon and accordingly, this is particularly effective for the removal of organic dyes from the cleaning solvent passed therethrough.

It has been found that by removing the organic dye contaminants, the new fluid quality for the perchloroethylene is enhanced from a value point of view. It has been demonstrated that the process removes the fatty acid content in contaminated fluid and by making use of the anionic resin, the overall fluid quality can be significantly improved by the removal of the dye components.

Once the fluid exits the resin vessel 24 at 26, the fluid is essentially "pure". In this state, the fluid can be recirculated via line 28 back into the cleaning unit 12 for reuse. A flow meter 30 may be provided in the line 28 to monitor the flow of fluid entering into the unit 12.

As is evident from the figure, both resin vessels 20 and 24 are connected in a series loop with the cleaning cycle. Resin volumes are dictated by maximum resin flow rates as well as the dry cleaning machine solvent circulating pump capacity. As an example, in one testing run, the unit 12 had a circulation rate of 2.8 g.p.m. (gallons per minute) and therefore 0.5 cubic feet of both resins was used in each vessel 22 and 24.

In view of the fact that both resins are utilized in the garment cleaning cycle, excess water greater than 15,000 p.p.m. (parts per million) can pose a concern and therefore part of the resin regeneration involves flushing the resins with pure cleaning solvent so that excess water is carried away. This is advantageous since excess water, generally above the 15,000 p.p.m. amount can contribute to garment shrinkage during the drying cycle.

The anionic resin in vessel 22 was treated with a 4% sodium hydroxide solution. Shrinkage of the resin (estimated at an average 20%) was noted after contact with the dry cleaning solvent. Changes were made in the resin container center-tube to compensate for resin shrinkage so that resin beads did not carry over the dry cleaning unit.

The sorbent resin was treated with a 4% sodium hydroxide solution and then finished with a 4% hydrochloric acid solution.

During a preliminary test on a dry cleaning unit, solvent pH was measured in the main reservoir 14, at the inlet to the anionic resin 22 at the inlet to the sorbent resin container 24 and at the discharge of the sorbent resin container 26. Results of the pH are listed in Table I.

TABLE I pH DATA FOR VARIOUS LOCATIONS IN THE APPARATUS

| SAMPLE LOCATION | TRIAL NUMBER | PH | FLOW (G.P.M.) | TIME |
|---|---|---|---|---|
| A | 1 | 6.2 | 2.8 | 12.42 |
| A | 2 | 6.9 | 2.8 | 12.47 |
| B | 1 | 7.9 | 2.8 | 12.42 |
| B | 2 | 8.2 | 2.8 | 12.47 |
| C | 1 | 6.9 | 2.8 | 12.42 |
| C | 2 | 7.1 | 2.8 | 12.47 |

Based on the above data in Table I, it is clear that the significantly acidic dry cleaning fluid, subsequent to treatment according to the above-mentioned process resulted in a significant elevation in the pH to a substantially basic dry cleaning fluid.

TABLE II

| LOCATION | 1 | 2 | 3 | 4 |
|---|---|---|---|---|
| Total Aliphatic HC (μg/ml) | 800 | 7530 | 863 | 11100 |
| Total Aromatic HC (μg/ml) | 95 | 1153 | 91.8 | 343 |
| Total Fatty Acids (μg/ml) | 0 | 320 | 12.9 | 8.6 |

* HC = hydrocarbons

In Table II, the samples were tested from the following locations: No. 1 is equal to new perchloroethylene sample; No. 2 is taken at the dry cleaning units main reservoir 14; No. 3 is taken at the discharge of the sorbent resin vessel 24; and No. 4 represents data generated from a sample from a distillation unit discharge for comparative purposes.

As is clearly evident from the above data, the perchloroethylene which was sampled at the discharge of the sorbent resin 24 at location 26 had a significantly reduced total fatty acid content per unit volume as compared to that at the main reservoir 14.

It will be fully appreciated by those skilled in the art that the use of the anionic resin as a preconditioning or pretreating process subsequent to filtration is not essential to the effective operation of the apparatus and method. The use of the anionic resin is simply to prolong the lifespan of the sorbent which would otherwise be somewhat reduced in the absence of the anionic treatment.

Furtherstill, by practicing the method according to the present invention, most of the objectionable soluble impurities and solid particles such as lint and garment debris are removed in the cleaning loop during the cleaning process, thereby maintaining the colour and quality of the cleaning solvent so that the characteristic gradual solvent quality and colour degradation is eliminated. As a further attendant feature, the method of the present application minimizes the environmental impact of the dry cleaning process by eliminating the requirement of solid particle pleated paper activated carbon elements and the disposal of the same in accordance with environmental regulations.

Maintaining the cleaning solvent in a "new" condition negates the requirement for fluid replacement or for the partial distillation of the same and the disposal of the distillation concentrate in accordance with environmental regulations. It has been found additionally that air emissions of the dry cleaning solvent are significantly decreased with the elimination of the distillation process (up to 25% fluid loss per cleaning cycle) and are limited to the drying cycle only.

The method of the application, although particularly applicable to the removal of contaminants produced as part of a dry cleaning cycle, is not dependant on any particular cleaning solvent such as perchloroethylene, but rather applies to any, and all cleaning solvents.

Further, the sorbent resin, indicated to be treated with sodium hydroxide and then hydrochloric acid is merely a parameter optimization for the method. The hydrochloric acid was utilized to enhance the efficiency of the sorbent resin as well as provide a means of maintaining a neutral pH in the cleaning solvent so that garment chemical stress is minimized.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of regenerating dry cleaning fluid comprising the steps of:

providing a source of contaminated perchloroethylene contaminated with insoluble and soluble contaminants, said contaminants including organic dye contaminants;

filtering, in a first step, said contaminated perchloroethylene to remove said insoluble contaminants;

flushing, in a second step, a sorbent resin with uncontaminated perchloroethylene to reduce water content therein to below 15,000 ppm;

treating, in a third step, said contaminated perchloroethylene with said flushed sorbent resin from said second step and removing said soluble and organic dye contaminants in said contaminated perchloroethylene whereby said perchloroethylene is regenerated to new fluid quality.

2. The method as set forth in claim 1, wherein said new fluid quality contains about 800 μg ml$^{-1}$ total aliphatic hydrocarbons, about 95 μg ml$^{-1}$ total aromatic hydrocarbons and substantially no fatty acids.

3. The method as set forth in claim 1, further including the step of pretreating, prior to said second step, said contaminated perchloroethylene with an anionic exchange resin to remove at least some of said soluble contaminants.

4. The method as set forth in claim 1, further including the step of treating said sorbent resin with a solution of sodium hydroxide subsequent to said third step.

5. The method as set forth in claim 1, further including the step of treating said sorbent resin with a hydrochloric acid solution subsequent to said treatment with said sodium hydroxide solution.

6. The method as set forth in claim 1, wherein said new fluid quality has a basic pH.

7. The method as set forth in claim 6, wherein the basic pH is about 7.1.

* * * * *